(12) United States Patent
McCowan et al.

(10) Patent No.: US 7,596,097 B1
(45) Date of Patent: Sep. 29, 2009

(54) METHODS AND APPARATUS TO PREVENT NETWORK MAPPING

(75) Inventors: David James McCowan, Scituate, MA (US); Jeffrey A. Kraemer, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 11/372,435

(22) Filed: Mar. 9, 2006

(51) Int. Cl.
*H04L 12/50* (2006.01)
(52) U.S. Cl. .................................. 370/248; 370/359
(58) Field of Classification Search ............... 726/2, 726/3, 11, 14; 825/825.36, 7.2, 7.28, 7.29; 370/394, 392, 391, 390
See application file for complete search history.

(56) References Cited

U.S. PATENT DOCUMENTS

| | | | |
|---|---|---|---|
| 7,082,129 B2 * | 7/2006 | Cromer et al. | 370/389 |
| 7,171,683 B2 * | 1/2007 | Pazi et al. | 726/13 |
| 7,421,737 B1 * | 9/2008 | Hernacki et al. | 726/22 |
| 2004/0151179 A1 * | 8/2004 | Andre et al. | 370/392 |
| 2005/0180421 A1 * | 8/2005 | Shimada et al. | 370/389 |
| 2005/0207410 A1 * | 9/2005 | Adhikari et al. | 370/389 |
| 2007/0019543 A1 * | 1/2007 | Wei et al. | 370/229 |

\* cited by examiner

*Primary Examiner*—Chi H Pham
*Assistant Examiner*—Fan Ng (57) ABSTRACT

A trace detector prevents network mapping and tracing by detecting an initial packet containing an initial time to live value that meets a first predetermined threshold range. The trace detector identifies a source address of the initial packet and adjusts a threshold time to live range for detection of at least one subsequent trace route or response packet associated with the source address of the initial packet. In response to detecting the subsequent packet(s), the trace detector processes the subsequent packet(s) associated with the source address of the initial packet according to a security policy to prevent a trace process originating the initial packet from tracing a network using the at least one subsequent packet.

16 Claims, 3 Drawing Sheets

METHODS AND APPARATUS TO PREVENT NETWORK MAPPING

BACKGROUND OF THE INVENTION

Modern computer networks are configured as an interconnection of many computer systems links by a set of interconnected data communications devices or nodes such as routers, switches, and gateways. The links between the computers and data communications devices may be physical network cables or wireless links. Typically, a network administrator configures each of the computers and data communications devices in the network with a respective network address. A computer that needs to transmit data to a remote computer across the network creates a series of packets for the data. Each packet includes header information that contains a source network address (e.g. an Internet Protocol or IP address) of the computer originating the packet, as well as a destination address of the computer or other device that is to receive the packet. Other information may be contained in the header as well.

To send a packet to the remote destination computer, the source computer transmits the packet to the first data communications device coupling that source computer to the network. This device, which is commonly a router or switch, is the first node or hop on the network. The device examines the packet header to determine where to next transmit the packet based on the destination address encoded within the packet header. Upon determining on which route to send the packet, the device forwards or retransmits the packet to the next hop thus moving the packet across the network further towards its destination. Each data communications device in the network operates in a similar manner such that the packet eventually reaches its intended destination.

Long ago in computer networking, it was discovered that network loops might occur within data communications networks. Generally, a network loop is a configuration anomaly within a set of data communications devices that could cause packets to follow an endless loop within the network. As an example, the packets would move from router to router in a circle and never leave the network. Over time, the number of packets traveling in this loop would accumulate to the point that the routers in the loop would suffer from performance degradation and become unable to route non-looping packets in a timely manner. To overcome this drawback, data communications engineers added a time to live field in packet headers. The contents of the time to live field of a packet indicates a time a packet is allowed to live on the network. Network devices simulate passage of time by decrementing this field at each hop.

To use the time to live of a packet, when a source computer sends a packet to a target computer along a path of routers, the source computer initializes the contents of the time to live field of the packet to an initial value (e.g., between 0 and 255) prior to sending the packet along the path toward the target computer. Many common communications protocols set the initial value of the time to live field to be high enough to ensure that the packet will reach its intended destination. Common initial time to live values are 64 or 128. Each router to receive the packet decrements the contents of the time to live field of the packet, and determines whether the packet is stale by comparing the decremented contents to a predetermined value (e.g., 0 or 1). If the packet is stale, the router removes the packet from the network and sends an Internet Control Message Protocol (ICMP) error message back to the source computer (identified in the source address of the packet) to indicate that the router has removed the packet from the network. However, if the packet is not stale, the router forwards the packet to the next router or "hop" (as determined by packet routing protocols) along the network path leading to the target computer. The next router then processes the packet in a similar manner, and so on, until the packet arrives at the target computer, or until a router along the path removes the packet because the packet has become stale. Accordingly, any packet which is endlessly caught in a loop inevitably will become stale (as routers decrement its time to live field contents) and be removed from the network by a router.

Many conventional computer systems include, as part of their operating system, a "trace route" utility that allows a system administrator or other user of the computer to trace a route from one computer to another address on a network. Generally, the trace route utility identifies nodes that form a network path from the source computer to the target computer. Trace route relies on the above-described time to live feature of packets to identify each hop on the network path or route between two computers. To use trace route, at a source computer, a system administrator invokes the trace route utility and specifies a destination address. In response, trace route generates a packet and sets the time to live field of that packet initially to 1. Trace route then sends that packet onto the network from the source computer to the target or destination computer. Assuming that the first data communications device to receive the packet is a node other than the target computer, the first data communications device receiving the packet decrements the contents of the time to live field and determines that the packet is stale (e.g., the time to live contents now equal 0). Accordingly, the first data communications device removes the packet from the network and sends an Internet Control Messaging Protocol (ICMP) message back to the source computer (as identified by the source address in the packet originated by trace route). The source computer receives this ICMP message and is able to identify the first data communications device along the path leading to the target computer (e.g., from source address information in the header of the ICMP error message), and the round trip time (e.g., by calculating the difference between the time the source computer sends the packet and the time the source computer receives the ICMP error message.

The source computer then generates another trace route packet and sets the time to live field of that packet to 2. The source computer then sends that packet toward the target computer along the path. When the first data communications device receives that packet, the first data communications device decrements the contents of the time to live field and determines that the packet is not stale (e.g., the time to live contents are greater than 0). Accordingly, the first data communications device identifies a next or second data communications device on the path leading to the target computer, and sends the packet to the second data communications device. When the second data communications device receives and processes the packet, the second data communications device determines that the packet is now stale, removes the packet from the network, and sends an ICMP error message back to the source computer. The source computer processes this ICMP error message to identify the second router and an determine the round trip time for the packet.

The source computer continues to (i) generate packets with time to live fields having higher and higher values, and (ii) send those packets toward the target computer until the target computer finally receives a packet and does not respond with an ICMP error message (e.g., the target computer can respond with an acknowledgement message). The series of ICMP error messages that the source computer receives prior to reaching the target computer enable the source computer to identify the sequence of data communications devices (i.e. by address) that packets travel along the path or route leading from the source computer to the target computer (assuming that the path did not change during the route tracing process).

SUMMARY

Some computer users commonly referred to as network hackers or attackers can use network administration tools such as trace route for malicious purposes. As an example, they may use trace route to collect information about a network topology and to learn about other IP addresses on or within a corporate network to plan an attack on that network. This process is called network mapping or tracing. Gathering as much information as possible about a given network is often the first step in an attacker's plan to exploit a network. For example, by identifying a network and its associated devices, an attacker can search for vulnerable nodes on this network. As noted above, trace route is a tool that is generally used to identify sources of network connectivity problems. Users of the tool can identify routing problems or whether a firewall is blocking access using trace route.

Also as noted above, a user operating trace route causes a series of packets to be sent onto the network towards a destination, each with a subsequently increasing time to live values. In response, the trace route process receives an error response from each network device in the network path that decrements the time to live field to zero within the series of packets sent, until a trace route packet with a sufficiently large time to live sent from trace route eventually reaches the intended destination or target address. While perimeter firewalls typically block trace route inbound packets with a time to live of 1, some malicious trace route scanners simply increment the time to live by one if no response is received, such that that the node does not drop the subsequent trace route packet, but only the one with the time to live of 1. This allows the malicious trace route program to complete mapping the network path and avoid being dropped.

Likewise, many trace routes (i.e., sequences of packets generated by a trace route process or network tracing protocol) originate from compromised systems within an organization. Compromised systems infected by malware can launch a trace route back to the perimeter or to other internal nodes within, for example, a corporate network to identify subnetworks within the corporate network. This malware maps the internal network from within bypassing a perimeter security measure of dropping packets with a time to live of 1 and can thereafter forward the mapping information to an outside entity.

In contrast, the present system disclosed herein prevents an attacker from using trace route to map an enterprise or other network. The solution disclosed herein involves detecting the situation of a process at a source address operating a trace route scan, associating a sequence of packets with an instance of the trace route scan, and using this information to modify security posture to either block incoming trace route packets with higher time to live values, or block responses, or provide misinformation in such responses to confuse the scanning entity. This solution is effective, for example, when both network devices (i.e., routers, switches) and end host systems implement this capability, however there is no interdependency which prevents this solution from functioning effectively when present only on one type of component (i.e. in hosts or in data communications devices).

Other embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Cisco Systems, Inc. of San Jose, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments disclosed herein provide a computerized device such as a data communications device (a router, switch or other such device) or a host computer system configured with a trace detector operable to detect and prevent trace route mapping of a network. Embodiments include the computerized device, as well as the trace detector itself such as may be embodied only in software.

In an example operation, trace route detection occurs either when a trace detector detects a packet specifying a time to live that falls below or within a threshold value or range, or when the system detects an ICMP time exceed error message. Typically, end host systems detect low time to live values and network devices detect ICMP time exceed error messages, though embodiments are not limited as such. The system provides a trace detector (i.e. a process or application) that prevents network tracing by detecting an initial packet containing an initial time to live value that meets a first predetermined threshold range. As an example, the trace detector may receive an initial trace route packet containing a time to live value within a lowest threshold range (e.g. 1 through 4). The trace detector identifies a source address of the initial packet and "remembers" or otherwise stores this value as a potential trace route. The trace route detector can then drop the initial trace route packet, or can chose to perform time to live processing on this packet to decrement the time to live field and can forward the packet further towards it destination address. Thereafter, the trace detector detects at least one subsequent packet associated with the source address of the initial packet. This subsequent packet in one embodiment may be another trace route packet with a higher time to live value, or may in an alternative embodiment be a trace route response packet (e.g. an ICMP response) being returned to the source address of the initial trace route packet. In response to detecting the subsequent packet, (which is what confirms the likeliness of a trace route) the trace detector processes the subsequent packet associated with the source address of the initial packet according to a security policy to prevent a trace process originating the initial packet from tracing a network using the subsequent packet. Thus by either blocking the subsequent ICMP response, or dropping the subsequent (i.e., next) trace route packet, embodiments of the trace detector disclosed herein prevent a trace route process from successfully operating thus preventing network tracing and/or mapping. In one configuration, the determination of dropping or forwarding of a packet is configurable and maybe tied to the source address of the packet to allow legitimate users (administrators) to use a trace route program without interference from the system disclosed herein.

In one configuration, the trace detector adjusts a first predetermined threshold range of time to live values upward to a second predetermined threshold range after detection of a trace route packet with a given time to live. In one configuration, the range is increased by a predetermined value above the highest observed trace route TTL value. For example, the initial range may be 1 to 5 where the incremental value is 4 and thus a detected TTL of 3 increases the range from 1 to 7. By adjusting the range of detection up, this allows detection of subsequent packets that are subsequent trace route packets originating from the source address of the initial trace route packet and that have time to live values that are potentially higher than time to live values within a first predetermined threshold range (i.e. the 1 through 4 range). In one configuration, the trace detector establishes the first predetermined threshold range to cover time to live values that are less than a range of time to live values covered by the second predetermined threshold range. As an example, the first range might be to detect all packets with a time to live of 1 through 4. Upon detecting such a packet, the trace detector disclosed herein can store the value of the source address of that packet, and assume a trace route is happening if another packet from that source appears thereafter with a higher time to live.

Thus, the trace detector in one configuration increments an upper bound of the first predetermined threshold range (i.e. increments the upper bound of 4 to say, 8 or 10, for example) to create the second predetermined threshold range (i.e., a new range of 1 through 8 or 10) that includes time to live values equal to and greater than time to live values covered by the first predetermined range (i.e., includes 1 through 4), but is less than time to live values used within packets produced by non-network tracing protocols. In one configuration, there is an upper limit to how much the range can grow, such as 32, so that the upper bound does not get incremented above 32 to avoid covering TTL values that might be used in non-tracing protocol packets. As noted above, non-network tracing protocols typically set an initial time to live value of 64 or 128 on packets, and this value is decremented as the packets move from device to device. It is not common however for non-network tracing protocols to have time to live values in packets decremented below a value of, for example, 32. As such, the system disclosed herein is based in part on the assumption that if a packet has a time to live below 32, and the initial time to live seen is within a first threshold range, such as 1 through 4, and other packets received and detected by the trace detector shortly thereafter are from the same source (or destined for the same destination) also have time to live values that are getting incrementally higher (such as 1, 2, 3, 4, 5, 6, etc.), it can be assumed a network trace is being attempted.

In one configuration, the trace detector increments the upper bound of the first predetermined threshold range by adding an incremental value to a detected time to live value in a trace route packet. As an example, if the detected TTL is 4 and the first range is 1 through 5, and the incremental value is 4, the new range would be 1 through 8 (since the incremental value is added to the currently detected TTL value of 4). In one configuration, the trace detector establishes a limit on an upper bound of the second predetermined threshold range. The limit can be either a fixed maximum upper bound limit or an upper bound limit based derived from a depth of the network.

The trace detector can disable further transmission of the subsequently detected trace route packets (e.g. can drop them, quarantine them, etc.). The trace detector repeats the operations of detecting at least one subsequent packet associated with the source address of the initial packet and in response, dropping that subsequent trace route packet to block trace route packets originating from the source address of the initial trace route packet. In alternative configurations, the trace detector can formulate at least one trace route response packet for at least one of the detected trace route packets. The trace route response packet includes misinformation concerning the identities of devices for which a response would have been provided had the initial trace route packet and/or the subsequent trace route packets or responses not been dropped. In one configuration for example, the trace detector can modify the original source network device address to a honeypot address on a VLAN.

In another configuration, the subsequent packet associated with the source address of the initial packet is a trace route response and thus the trace detector allows the trace route packets to pass through. In such a configuration, the trace detector blocks a return of the trace route response message (s) to the destination address equivalent to the source address of the trace route packet. In an alternative configuration, the trace detector formulates a replacement trace route response packet that includes misinformation concerning an identity of a device identified within the blocked trace route response message.

Figure 1:
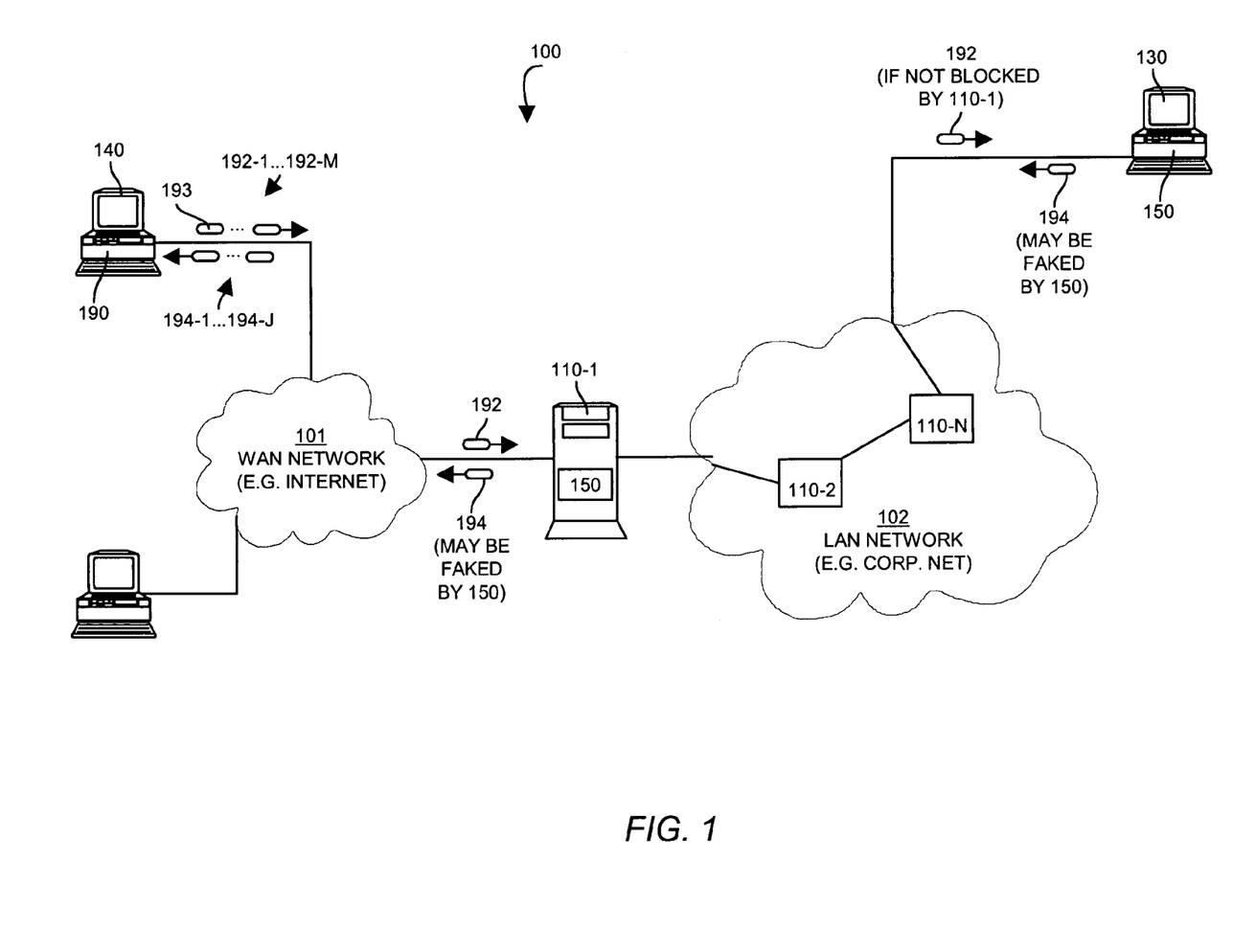
FIG. 1 illustrates an example configuration of a network environment that includes a data communications device and host computer configured with a trace detector configured as disclosed herein.

FIG. 1 is an example network environment 100 suitable for use in explaining example embodiments of a trace detector as disclosed herein. The network environment 100 includes a wide area network 101 such as the Internet coupled by an edge data communications device 110-1 such as a router, firewall or switch to a local area network 102 that may be a corporate network for example. The local area network 102 includes a host computer system 130 coupled through a number of interconnected data communications devices 110-2 through 110-N to the edge data communications device 110-1 to allow data communications traffic between the host computer system 130 and other host computer systems 140 connected to the wide area network 101. In this example, each of the data communications devices 110 in FIG. 1 are owned or operated or are under the control of an entity such as an organization or corporation is interested in preventing attacking computer systems on the Internet 101 from tracing or mapping the local area network 102. To prevent such tracing or mapping, an administrator of the network 102 configures the edge data communications device 110-1 (and possibly other data communications devices 110-2 through 110-N), as well as each host computer system 130 within the network 102 with a trace detector 150 as disclosed herein.

Suppose for this example that the host computer system 140 is configured with malicious software that operates as a trace route program 190 that attempts to trace and/or map the interconnection of data communications devices 110 within local area network 102. To do so, the trace route program 190 operates by creating and transmitting a series of trace route packets 192, each containing a destination address of the host computer system 130 within the local area network 102. Each trace route packet 192 that the trace route program 190 transmits contains a successively higher time to live value 193. As these trace route packets 192 propagate through the wide area network 101, each data communications device within the wide area network 101 will decrement the time to live value within each of the trace route packets 192. When the time to live value 193 of each packet 192 its decremented to zero by any particular device within the wide area network 101, that device will drop the packet 192 and will return an ICMP trace route response or error packet 194 back to the trace route program 190 operating in the host computer system 140. The trace route response or error packet 194 identifies the address of the device that dropped the trace route packet 192. Since the sequence of transmitted trace route packets 192 begins with low time to live values, the trace route program 190 will receive a trace route response 194 from each data communications device along the data communications route through the wide area network 101 as the series of successively higher time to live trace route packets makes their way, device by device, towards the data communications device 110-1 that is the entry point of the local area network 102 (i.e., on their way towards the host computer system 130 to which each is addressed). In this manner, the trace route program 190 can trace and map the path through the Internet 101 up to the point the trace route packets 192 reach the edge data communications device 110-1 equipped with the trace detector 150 as disclosed herein, just as conventional trace route operates.

As explained herein, generally, the trace detector 150 can operate, for example, in the data communications device 110-1 and can identify arriving trace route packets 192 having a time to live field within a predetermined range. The initial trace route packet 192, of the series sent from the trace route program 190, that reaches the data communications device 110-1 will have a low time to live value since this value will have been decremented at each device within the network 101 on its way to the data communications device 110-1. The time to live may be in the range, for example, of 1 through 4. Once identified, the trace detector 150 operating in the data communications device 110-1 can store the source address of such a trace route initiated packet for future reference. Depending upon the configuration as described herein, the trace detector 150 can either drop the trace route packet 192 altogether (thus preventing further propagation) and provide no trace route response 194. In such a case, the trace route program 190 will receive no response 194 and may chose to send another trace route packet with a higher time to live value. This subsequent trace route packet 192 will have a time to live greater than 1 (e.g., it may be 2, 3 or 4). Depending upon the configuration, the trace detector 150 can allow the subsequent trace route packet 192 to pass through (assuming its time to live is greater than 1) after performing time to live processing to decrement the time to live field of the packet 192 by one. However, since the trace detector 150 has "remembered" the source address and has thus now detected a sequence of trace route packets having time to live values getting incrementally higher, the trace detector 150 can (depending upon the configuration) drop the trace route response packet(s) 194 generated by another device that has decremented the time to live field to zero in the original or initial trace route packet (the trace route response being the ICMP response to the trace route packet 192 that was allowed to pass through the edge data communications device 110-1).

In other embodiments, the trace detector 150 can maintain an initial range of time to live values that the trace detector looks for within suspected trace route packets. Initially, the threshold range can be rather small, such as time to live values ranging from 1 through 4, such that packets arriving with a time to live value in this first range are recognized and the source IP address is stored. After detecting such a packet (with a time to live in the first range), the trace detector 150 can increment the range upper bound to now include more time to live values to thus recognize subsequent trace route packets from the same source, but that have higher time to live values. By keeping the range initially low, this avoids activation of trace route blocking for packets that are non-trace protocol packets (i.e. packets from a legitimate data communications protocol) that may have happened to be decremented to low values (e.g. above 4, but below 10).

Also, by adjusting the range upward upon detection of a first low value time to live packet, the system disclosed herein can detect sophisticated attackers that attempt to skip time to live values for which responses are not received by the trace route process 190 that is initiating the series of trace route packets 192. Thus, a sequence of packets might be sent from the trace route program 190 that eventually reach the data communications device 110-1 with time to live values of 1, 2, 3, and 4, but if the trace program 190 does not receive a response 194 for this first set, the trace route process 190 might continue to send trace route packets 192 with time to live values of 5, 6, 7 and 8 and so forth. By having the trace detector 150 adjust the range of detectable (and thus actionable) time to live values in suspected trace route packets upwards, an attacker will not be able to overcome a firewall or other device that only blocks packets with time to live values of 1.

As an example, suppose trace route 190 transmits packets 192 with time to live values from 1 to 30 where the upper bound (30) is sufficient to enumerate and traverse most network paths. Network stacks or non-tracing network protocols (e.g. HTTP, SMTP, FTP, etc.) typically use time to live values of 64 or higher (e.g. 128, or 256). Such non-tracing network protocol packets have time to live values that are larger than necessary because source machines do not know how many network devices are in the network path and by setting an initially high time to live value, such non-tracing protocols ensure that their packets will not time out. The embodiments disclosed herein are based in part on the observation that small time to live values may indicate that a source host 140 is manipulating the time to live value and is attempting to perform a trace route to map or trace a network 102. The threshold time to live value of the range can be chosen to include low valued time to live packets (e.g. in the range of 1 through 4, by way of example only) to reduce the likelihood of dropping legitimate packets that have high valued time to live fields.

In one configuration, a network data communications device 110-1 can allow the initial trace route packet 192 through and wait for an ICMP time exceeded message 194 in response. The network device 110-1 may allow the initial packet 192 with the time to live detected in the first range to avoid false positives, avoid breaking legitimate network error messages, or avoid burdening fastpath processing. Conversely, if the trace detector 150 is configured within an end host system 130, the end host 130 can be configured to always drop the initial trace route packet 192. Furthermore, an end host system 130 can be configured to drop (i.e. not send) outbound trace route packets 192 (if the trace route program 190 were installed within the host 130, maybe due to malware) to prevent an infected host 130 in the corporate network 102 from serving as the launching point for a trace route mapping attempt.

Certain configurations of the trace detector 150 disclosed herein associate a sequence of packets 192 with an instance of a trace route scan by using an expanding window or threshold range of time to live values. The expanding window can include tracking the IP address pair (source and destination) and the last seen time to live value and a time window. Packets 192 must fall within parameters of the window to be associated with a trace route instance. The window or range expands as subsequent packets 192 arrive with increasing time to live values. The trace detector 150 thus establishes a time to live threshold from which to begin detection and tracking instead of simply detecting expired time to live values. By providing an expanding window or range of detected or searched for time to live values, the trace detector 150 increases detection of true-positives associating a packet with a trace route that increases the time to live value by a factor other than 1. Also, by expanding the range or window, the system increases true-positives by associating packets specifying higher time to live values with a trace route instance. Conversely, the expanding window reduces false-positives by allowing packets that have unusually low time to live values but that are above the first threshold range. The trace detector 150 protects against malware such as a remote controlled Trojan horse program or virus from mapping an enterprise network from a compromised host 130 within an organization.

Once detection of a trace route occurs, a network device 110-1 or end host 130 may add the originating or source IP address to a quarantine area where additional security measures apply. A network device 110-1 can forward packets 192 from the originating IP address to a protected VLAN. A security agent operating the trace detector 150 running on an end host system 130 can drop inbound trace route packets 192 or marks the host 130 as "untrusted" causing highly restrictive security policies to apply to all traffic to and from that host 130 (and can restrict operation of software within the host). An example of such software is the Cisco Security Agent (CSA) software made by Cisco Systems, Inc. Furthermore, CSA may notify Network Access Control via a Cisco Trust Agent to have a network device quarantine the end host 130 to a protected VLAN.

In other configurations, the trace detector 150 configuration includes the ability to specify the source of the mapping attempt by IP address. This prevents an attacker trace route program 190 operating on one host 140 from spoofing an address of another host 141 for the purpose of causing the network device 110-1 or end host system 130 to quarantine a legitimate host 141.

The certainty of detecting a trace route depends on how this solution detects the mapping attempt. There is a high level of certainty when an end host system 130 detects the host 140 originating a trace route packet 192. There is a lower certainty level when a network device 110-1 detects an ICMP time exceed message 194 or an end host 130 receives a packet 192 with a low time to live. An administrator can configure different quarantine restriction levels for each certainty level. In one configuration, the range has an upper bound and need only grow to the depth of the networks being protected times two (2) since any TTL larger than that would reach the intended target. Network depth is sufficient for a perimeter device, but depth times two (2) is necessary for internally originated trace routes.

Another configuration provides the ability for end host systems 130 to vary the time to live value specified in outbound network traffic 194 (where 194 in this instance is for any traffic leaving the host 130) to avoid attempts by an attacker to bypass this solution. For instance, an attacker may attempts to first successfully connect using a non-tracing protocol to the end host 130 in hopes of getting a response in accordance with the non-tracing protocol. Since many non-tracing protocols set a standard value for a time to live in a response packet, such as 64, 128, or 255 (where 255 is the maximum TTL value), based upon the time to live of the return traffic received by the attacking host 140, this host 140 may be able to deduce how many hops exist on the path to the end host 130 (by taking the difference from the original time to live value set by the responding host, such as 64, and subtracting the final time to live value of the response received by the malicious host 140). This gives the attacker some notion as to how many networks may be mapped and how many hops exist along the path. The trace detector 150 in the host 130 in one configuration interferes with this estimation by applying a random jitter to the time to live value of outbound packets to hide typical time to live starting values of non-tracing protocols such as by using any value ranging between 128 and 256 for each successive packet, and by selecting such values randomly.

Generally, in one configuration, a sample algorithm for an end host 130 is to check if the current time to live of an arriving packet 192 is greater than the threshold value. The trace detector 150 can allow this packet if it is not currently tracking any trace route attempts. Otherwise, if the time to live is within the first range, the trace detector 150 can check if the packet 192 arrived via a WAN adapter. It is noted that dial-up adapters typically specify time to live values of 1 when the protocol is BOOTP. The trace detector 150 can allow this packet if this condition is true. Otherwise, the trace detector 150 can check if this packet 192 matches a trace route in progress (via source address comparison). Matching in one configuration can involve testing the source address, and testing to determine if the current packet arrives within a given time frame since a previous packet, and testing to determine if the time to live of the current packet falls within the expanding window or current time to live threshold range. The trace detector can take action on this packet such as dropping the packet, or providing a response with misinformation back to the originator or source of the packet. The trace detector 150 can check if the packet time to live is less than or equal to the threshold value and can begin to track this trace route attempt and take action on subsequent packets as will be explained further below.

For a network device such as data communications device 110-1 in FIG. 1, the trace detector 150 can allow the initial trace route packet 192 but can remember the source of this packet 192. Thereafter, the data communications device 110-1 can check for an ICMP time exceeded trace route response message 194 from an internal network device 110-2 through 110-N or from the end host system 130. If such a packet is detected, the trace route process 150 in the data communications device 110-1 can begin to track a trace route instance and either drop all further trace route inbound packets 192, or can allow the inbound packets 192 and can drop all further ICMP time exceeded error messages 194 for each allowed trace route packet 192. The trace detector 150 can check if these subsequent packets 192 fall within the expanding window and if so, the trace detector 150 can drop the packet 192 and can continue to expand the upper bound of the range or window of "searched for" time to live values.

Figure 2:
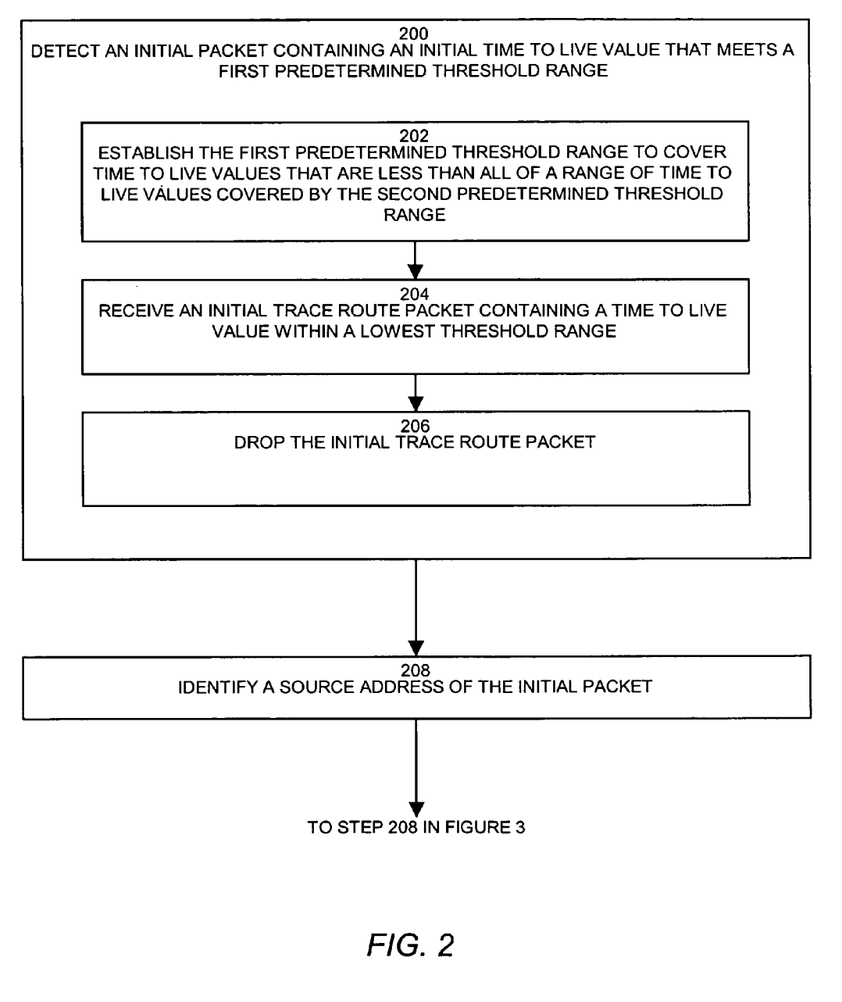
FIG. 2 is an architecture of a trace detector in according with an example configuration as disclosed herein.

FIG. 2 is a flow chart of processing steps that a trace detector performs in accordance with example embodiments to prevent network tracing and mapping.

In step 200, the trace detector 150 detects an initial packet containing an initial time to live value that meets a first predetermined threshold range. Steps 202 through 206 show details of this processing in one example configuration.

In step 202, the trace detector 150 establishes the first predetermined threshold range to cover time to live values 193 (e.g., 1 through 4) that are less than a range of time to live values (e.g. 1 through 8) covered by the second predetermined threshold range (the second range is not yet being detected upon startup). By maintaining ranges of time to live values to be detected and activating or expanding the active range as suspected trace route packets, the trace detector 150 can keep ahead of the trace route program attempting to further map or trace a network 102.

In step 204, the trace detector 150 receives an initial trace route packet containing a time to live value within a lowest threshold range. As an example, the time to live value of the first packet 192 might be 1, 2, 3 or 4, or so other low value within the first range.

In step 206, in one configuration (e.g. in a host 130), the trace detector 150 drops the initial trace route packet 192 to block trace route packets originating from the source address of the initial trace route packet. This step would be performed, for example, in a configuration within the host computer system 130. Alternatively, it could also be performed within the data communications device 110-1, or within any of the data communications devices 110-2 through 110-N.

In step 208, the trace detector 150 identifies a source address of the initial packet. This is the address of the originator of the trace packet 192. In alternative configurations, the trace detector can also identify the source and destination address pair, and a timestamp at which time the trace route packet 192 was received.

Figure 3:
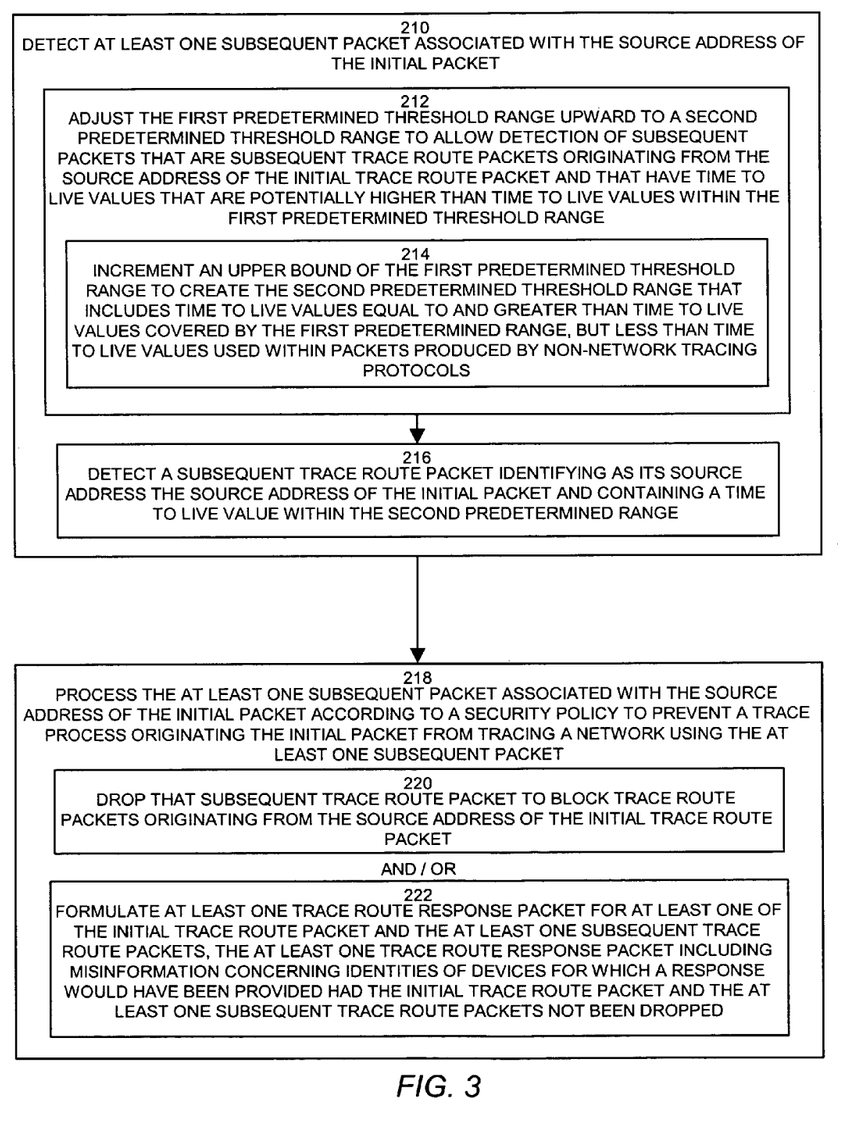
FIG. 3 is a flow chart of processing steps for prevention of network tracing according to one example configuration disclosed herein.

FIG. 3 is a continuation of the flow chart of processing steps from FIG. 2 and shows further details of the trace detector processing.

In step 210, the trace detector 150 detects at least one subsequent packet associated with the source address of the initial packet. To perform detection of subsequent packets related to the source address of the initial packet, the trace detector 150 can also match the source and destination address pair, and can also evaluate whether the subsequent packet is received within the device 110 or host 130 operating the trace detector within a predetermined time window as set by the timestamp in step 208. Steps 212 through 216 show details of this processing in one example configuration.

In step 212, the trace detector 150 adjusts the first predetermined threshold range (e.g., initially set from 1 through 4) upward to a second predetermined threshold range (e.g. now set from 1 through 8) to allow detection of subsequent packets that are subsequent trace route packets 192 originating from the source address (i.e. of host 140 attempting to perform the trace route) of the initial trace route packet 192 and that have time to live values 193 that are potentially higher than time to live values within the first predetermined threshold range (1 through 4). In other words, in step 212, the trace detector adjust the time to live search range from 1 through 4 to 1 through 8 in order to detect subsequent trace route packets 192 that have higher time to live values.

In step 214, the trace detector 150 increments an upper bound (i.e., 4 is now set to 8) of the first predetermined threshold range to create the second predetermined threshold range (1 through 8) that includes time to live values equal to and greater than time to live values covered by the first predetermined range (the first range was set 1 through 4), but less than time to live values used within packets produced by non-network tracing protocols (e.g., less than 32). By incrementing the range only slightly, by four values, non-tracing protocols that might happen to be operating on the host 140 (i.e. that have the same source address) but that have higher valued time to live fields in their packets will not be effected by this particular configuration.

In step 216, the trace detector 150 detects a subsequent trace route packet identifying as its source address the source address of the initial packet and containing a time to live value within the second predetermined range (i.e. within the range of 1 through 8). In this manner, once a trace route is detected, subsequent trace route packets are detected, even though the trace route program 190 is maliciously raising the time to live values of those subsequent packets 192 (when the trace route program 190 has not received a response to earlier lowered valued time to live fields of earlier trace route packets 192 (that were also dropped by the trace detector 150).

In step 218, in response to detecting the subsequent packet(s) 192, the trace detector 150 processes the subsequent packets associated with the source address (i.e. of host 140) of the initial packet according to a security policy to prevent a trace process 190 originating the initial packet 192 from tracing a network 102 using the subsequent packets (with higher time to live values). Steps 220 through 212 show details of this processing in one example configuration.

In step 220, the trace detector 150 drops the subsequent trace route packet(s) 192 to block trace route packets originating from the source address of the initial trace route packet. In a host 130, the trace detector 150 can thus block outgoing packets 192. In the data communications device 110-1, the trace detector 150 can block and drop incoming packets 192 form the host 140. Thus as the trace detector 150 drops packets 192, and the malicious trace route program 190 continues to raise the time to live value and attempt to further trace the network 102, those subsequent trace route packets will be detected (due to the trace detector incrementing the detection time to live range), and will be dropped as well.

In step 222, the trace detector 150 formulates at least one trace route response packet 194 for either the initial or subsequent trace route packets 192. The trace route response packet 194 includes misinformation concerning identities of devices for which a response 194 would have been provided had the trace route packet 192 not been dropped. In this manner, the data communications device 110-1 or host 130 operating the trace detector 150 can create a fraudulent or fake response that misidentifies the actual source of the response 194 so as to confuse the trace route program 190 that is attempting to map the network 102. Step 222 is optional.

From the foregoing, embodiments of the trace detector prevent effective tracing or mapping of a network. Various alternative embodiments and configurations may exist as well. For example, in once configuration the trace detector receives a trace route packet 192 and performs time to live processing on the trace route packet to decrement the time to live value of the trace route packet and forwards the trace route packet towards a destination associated with the trace route packet and only blocks responses 194. In such a configuration, the trace detector 150 detects a trace route response packet 194 having a destination address equivalent to the source address of the trace route packet 192. In this configuration, the trace detector 150 blocks a return of the trace route response message 194 to the destination address equivalent to the source address of the trace route packet. Optionally, in this configuration the traced detector can also formulate a replacement trace route response packet that includes misinformation concerning an identity of a device (e.g. a responding router 110-2 through 110-N or the host 130) identified within the blocked trace route response message.

If operating within a host 130, the trace detector can further confuse the malicious host 140 by detecting any packet originating from a source network address outside of an organization that is preventing the network mapping and can formulate a response packet including a random time to live value included in a response so that when a process associated with the source address of the packet receives the response, the time to live value cannot be used to determine a number of network hops between the source address and the destination address. In this manner, by randomly selecting time to live values for all outbound packets sent from a host 130, standard time to live values cannot be used by the host 140 to infer a number of network hops.

When operating within a host computer system, the trace detector 150 can determine a host has been infected if permission has not be given for that host to create trace route packets. In such a configuration, the trace detector 150 can detect formulation of a trace route packet and can determine that the host computer system is not authorized to formulate a trace route packet. This may be specified in a security policy for that host, for example. The trace detector 150 can prevent transmission of the trace route packet within a network connected to the host computer system and in response to detecting formulation of the trace route packet and determining that the host computer system is not authorized to formulate a trace route packet the trace detector 150 can quarantine the host computer system such as by restricting its communication to a VLAN.

While the system and method have been particularly shown and described with references to configurations thereof, it will be understood by those skilled in the art that various changes in form and details may be made therein without departing from the scope of the invention encompassed by the appended claims. Accordingly, the present invention is not intended to be limited by the example configurations provided above.

What is claimed is:

1. A method for preventing network tracing, the method comprising:
    detecting an initial packet with a time to live value that is within a first predetermined threshold range by
    receiving an initial trace route packet with a time to live value within a lowest threshold range;
    identifying a source address of the initial packet;
    detecting at least one subsequent packet associated with the source address of the initial packet by
    adjusting the first predetermined threshold range by increasing an upper bound to produce a second predetermined threshold range to allow detection of subsequent packets that are subsequent trace route packets originating from the source address of the initial trace route packet and that have time to live values in the second predetermined threshold range; and
    in response to detecting the at least one subsequent packet, processing the at least one subsequent packet associated with the source address of the initial packet according to a security policy to prevent a trace process from tracing a network using the at least one subsequent packet.

2. The method of claim 1, where identifying a source address of the initial packet comprises:
    identifying identification information for the initial packet, the identification information including:
        a source and destination IP address pair of the initial packet; and
        a timestamp of the initial packet, the timestamp defining a time window during which subsequent packets associated with the initial packet can be detected.

3. The method of claim 1, where the second predetermined threshold range comprises time to live values equal to and greater than time to live values covered by the first predetermined range, but less than time to live values used in packets produced by non-network tracing protocols.

4. The method of claim 1, where increasing the upper bound comprises:
    adding an incremental value to a detected time to live value in the initial packet.

5. The method of claim 4, where increasing the upper bound of the first predetermined threshold range to produce the second predetermined threshold range comprises:
    establishing a limit on an upper bound of the second predetermined threshold range, the limit being at least one of:
    a fixed maximum upper bound limit;
    an upper bound limit derived from a depth of the network.

6. The method of claim 3, where detecting at least one subsequent packet associated with the source address of the initial packet comprises:
    detecting at least one subsequent trace route packet identifying as its source address the source address of the initial packet and comprising a time to live value within the second predetermined threshold range and in response, disabling further transmission of the subsequent trace route packet.

7. The method of claim 1, comprising:
    disabling transmission of packets with time to live values in the first predetermined threshold range.

8. A method for preventing network tracing, comprising:
    detecting an initial packet with an initial time to live value that is within a first predetermined threshold range by receiving an initial trace route packet with an initial time to live value that is less than time to live values used within packets produced by non-network tracing protocols;
    identifying a source address of the initial packet;
    detecting at least one subsequent packet associated with the source address of the initial packet by
    detecting a subsequent trace route packet identifying as its source address the source address of the initial packet and with a time to live value that has been incremented in comparison to the initial time to live value; and
    in response to detecting the at least one subsequent packet, processing the at least one subsequent packet associated with the source address of the initial packet according to a security policy to prevent a trace process from tracing a network using the at least one subsequent packet.

9. The method of claim 8, where processing the at least one subsequent packet associated with the source address of the initial packet according to a security policy to prevent a trace process originating the initial packet from tracing a network using the at least one subsequent packet comprises:
    disabling further transmission of the at least one subsequent trace route packet.

10. The method of claim 8, where detecting an initial packet with an initial time to live value that is within a first predetermined threshold range comprises:
    disabling further transmission of the initial trace route packet.

11. A method for preventing network tracing, the method comprising:
    detecting an initial packet with a time to live value that is within a first predetermined threshold range;
    identifying a source address of the initial packet;
    detecting at least one subsequent packet associated with the source address of the initial packet;
    in response to detecting the at least one subsequent packet, processing the at least one subsequent packet associated with the source address of the initial packet according to a security policy;
    where detecting an initial packet with an initial time to live value that is within a first predetermined threshold range comprises:
    receiving an initial trace route packet with an initial time to live value that is less than time to live values used within packets produced by non-network tracing protocols;
    where detecting at least one subsequent packet associated with the source address of the initial packet comprises:
    detecting a subsequent trace route packet identifying as its source address the source address of the initial packet and with a time to live value that has been incremented in comparison to the initial time to live value,
    disabling further transmission of the subsequent trace route packet;
    where detecting an initial packet with an initial time to live value that is within a first predetermined threshold range comprises:
    disabling further transmission of the initial trace route packet; and,
    where disabling further transmission of the initial trace route packet and the subsequent trace route packet comprises:
    formulating at least one trace route response packet for at least one of the initial trace route packet and the at least one subsequent trace route packets, the at least one trace route response packet including misinformation concerning identities of devices for which a response would have been provided had the initial trace route packet and the at least one subsequent trace route packets not been disabled from further transmission.

12. A method for preventing network tracing, comprising:
    detecting an initial packet with a time to live value that is within a first predetermined threshold range;
    identifying a source address of the initial packet;
    detecting at least one subsequent packet associated with the source address of the initial packet by
    detecting a trace route response message having a destination address equivalent to the source address of the initial packet;
    in response to detecting the at least one subsequent packet, processing the at least one subsequent packet according to a security policy to prevent a trace process from tracing a network using the at least one subsequent packet; and
    blocking a return of the trace route response message to the destination address equivalent to the source address of the initial packet.

13. A method for preventing network tracing, the method comprising:
    detecting an initial packet with a time to live value that is within a first predetermined threshold range;
    identifying a source address of the initial packet;
    detecting at least one subsequent packet associated with the source address of the initial packet; and
    in response to detecting the at least one subsequent packet, processing the at least one subsequent packet associated with the source address of the initial packet according to a security policy;
    where processing the at least one subsequent packet associated with the source address of the initial packet according to a security policy comprises:
    blocking a response message to a destination address equivalent to the source address of the initial packet;
    formulating a replacement response packet that includes misinformation concerning an identity of a device identified within the response message.

14. A computerized device configured to prevent network tracing, the computerized device comprising:
    a memory;
    a processor;
    an interconnection mechanism coupling the memory and the processor;
    where the memory is encoded with a trace detector application that, when executed in the processor, produces a trace detector process that operates in the computerized device to cause the computerized device to perform the operations of:
    detecting an initial trace route packet with a time to live value that is within a first predetermined threshold range;
    identifying an address pair and timestamp of the initial trace route packet, the initial timestamp defining a detection window during which subsequent packets associated with the initial trace route packet may be received;
    incrementing an upper bound of the first predetermined threshold range to create the second predetermined threshold range that includes time to live values equal to and greater than time to live values covered by the first predetermined threshold range, but less than time to live values used within packets produced by non-network tracing protocols;
    detecting at least one subsequent packet associated with the address pair of the initial packet and arriving within the detection window and having a time to live value within the second predetermined threshold range;
    processing the at least one subsequent packet associated with the source address of the initial packet according to a security policy to prevent a trace process originating the initial packet from tracing a network using the at least one subsequent packet; and
    where when the trace detector processes the at least one subsequent packet associated with the source address of the initial packet, the traced detector process causes the computerized device to drop the at least one subsequent packet; and
    to drop a response to the initial trace route packet.

15. The computerized device of claim 14, where when the trace detector processes the at least one subsequent packet associated with the source address of the initial packet:
    the processor is operable to formulate a replacement trace route response packet that includes misinformation concerning an identity of a device identified within a blocked trace route response message.

16. A computer program product that includes a computer readable medium having instructions stored thereon for preventing network tracing, such that the instructions, when carried out by the computer, cause the computer to:

detect an initial trace route packet with an initial time to live value that a first predetermined threshold range;

identify an address pair and timestamp of the initial trace route packet, the initial timestamp defining a detection window during which subsequent packets associated with the initial trace route packet may be received;

increment an upper bound of the first predetermined threshold range to create the second predetermined threshold range that includes time to live values equal to and greater than time to live values covered by the first predetermined threshold range, but less than time to live values used within packets produced by non-network tracing protocols;

detect at least one subsequent packet associated with the address pair of the initial packet and arriving within the detection window and having a time to live value within the second predetermined threshold range;

in response to detecting the at least one subsequent packet, process the at least one subsequent packet associated with the source address of the initial packet according to a security policy to prevent a trace process originating the initial packet from tracing a network using the at least one subsequent packet;

where the instructions cause the computer to:

drop the at least one subsequent packet;

drop a response to the initial trace route packet; and formulate a replacement trace route response packet that includes misinformation concerning an identity of a device identified within a blocked trace route response message.

* * * * *

UNITED STATES PATENT AND TRADEMARK OFFICE
CERTIFICATE OF CORRECTION

PATENT NO. : 7,596,097 B1
APPLICATION NO. : 11/372435
DATED : September 29, 2009
INVENTOR(S) : McCowan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Twenty-eighth Day of September, 2010

David J. Kappos
*Director of the United States Patent and Trademark Office*